United States Patent Office 2,988,538
Patented June 13, 1961

2,988,538
SOLUBLE POLYUREAS AND PROCESS FOR PRODUCING THE SAME
Wilhelm Thoma, Leichlingen, and Otto Bayer and Heinrich Rinke, Leverkusen, Germany, assignors to Farbenfabriken Bayer Aktiengesellschaft, Leverkusen, Germany, a corporation of Germany
No Drawing. Filed May 22, 1957, Ser. No. 660,769
Claims priority, application Germany June 4, 1956
9 Claims. (Cl. 260—77.5)

The invention relates to new soluble polyureas and to a process for producing the same. More particularly, the invention is concerned with polyureas which are soluble in water or in alkaline liquids.

It is well known to produce high molecular weight compounds having a plurality of urea linkings by reacting diisocyanates with diamines or by reacting diamines with phosgene. These polymers are soluble in certain organic solvents but insoluble in inorganic media.

It has also been known to produce polyureas soluble in alkalis by reacting phosgene with diamines having sulfonic acid radicals in their molecule. Such a procedure leads to high molecular weight compounds having a great many —$SO_3H$ groups in the chain which fact is undesired for many purposes since these compounds have a trend to gelation. They, furthermore, are strictly linear compounds.

It is, therefore, a primary object of the present invention to provide a new class of high molecular weight compounds having a plurality of urea groups. Another object of the present invention is to provide new polyureas which are water-soluble and alkali-soluble and which do not show the disadvantages of prior art. A further object of the invention is to provide a process for the production of polyureas which are water-soluble and alkali-soluble. Still further objects will appear hereinafter.

These objects are accomplished in accordance with the present invention by reacting organic diisocyanates with organic diamines which contain one or more acid groups in the molecule.

Any aliphatic, cycloaliphatic or aromatic diisocyanate is suitable as starting material in the process of the invention. Examples of such diisocyanates are 1,4-tetramethylene diisocyanate, 1,6-hexamethylene diisocyanate, 1,8-octamethylene diisocyanate, 1,2-propylene diisocyanate, cyclohexylene-1,4-diisocyanate, ω,ω'-diisocyanatodipropyl ether, 1,3-phenylene diisocyanate, 1,3-toluylene diisocyanate, 1,4-phenylene diisocyanate, diphenylene-4,4-diisocyanate, naphthylene-1,5-diisocyanate and dimethyl diphenyl methane-4,4'-diisocyanate. Also suitable for the reaction of the invention are diisocyanates which are obtained by reacting any desired diisocyanate with the bifunctional compound such as, for example, a glycol or a polyether or polyester with terminal hydroxyl groups the diisocyanates being in such an amount that free NCO groups result in the reaction product. It is also possible to employ masked diisocyanates the isocyanate groups of which are reacted with, for instance, a phenol or a compound with enolizable hydrogen. Such a masked diisocyanate, sets free its isocyanate groups only when heated to higher temperatures.

Suitable diamines for carrying out the present process are inter alia aliphatic, cycloaliphatic, aromatic, araliphatic and heterocyclic diamines which contain one or more acid groups, such as for example, sulpho groups, sulphinic acid groups, carboxyl groups and phosphoric acid groups. The amino groups can in this case be present both as primary and secondary amino groups. The diamines can also contain any desired additional substituents.

Among the large number of reactive diamines, the following are to be mentioned by way of example:

1,3-diaminobenzene-4-sulphonic acid,
1,4-diaminobenzene-3-sulphonic acid,
2,6-diaminotoluene-4-sulphonic acid,
4,4'-diaminostilbene-2,2'-disulphonic acid,
4,4'-diamino-dibenzyl-2,2'-disulphonic acid,
Benzidine-2,2'-disulphonic acid,
Benzidine-3,3'-disulphonic acid,
4,4'-diamino-3,3'-dimethoxy-diphenyl - 6,6' - disulphonic acid,
4,4'-diamino-2-methyl azobenzene-2'-sulphonic acid,
4,4-diamino diphenyl urea disulphonic acid,
4,4'-diamino diphenylamine-2-sulphonic acid,
2,6-diaminophenol-3-sulphonic acid,
$4^1,4^2$-diamino triphenyl methane-$2^3,4^3$-disulphonic acid,
2,4-diamino cinnamic acid,
2,5-diamino phenoxy acetic acid,
3,5-diamino benzoic acid,
3,6-diamino benzoic acid,
3,5-diamino benzene-1-carbamide taurine,
Diamino acids obtained by adding 2 mols of acrylonitrile to glycol or taurine and subsequent hydrogenation,
1,6-hexamethylene diamino-N,N'-diacetic acid, and also diamino sulphonic acids which are formed by condensation of several components with formation of amide, urethane, urea or ester, such as, for example, 1,8-bis-(3'-aminobenzamide)-naphthalene - 3,6 - disulphonic acid.

To a certain degree, the aforementioned diamino acids in the polyureas can also be replaced by diamines which do not have any acid group, for example by bis-γ-Aminopropyl methylamine,
Piperazine,
Guanidine,
1-dimethylamino-2,4-diaminobenzene,
3,5-diaminobenzene sulphamide,
2,4-diamino anisidine,
4,4'-diamino diphenyl sulphone,
Terephthalic acid dihydrazide,
5-amino-1,2,3,4-tetrahydroquinoline.

The reaction of the aforementioned components generally takes place in suitable solvents, such as, for example, formamide and dimethyl formamide. It is possible to introduce the diamino acids either as salts or in the form of acids. In the event of free diamino acids being used, it is advisable to add tertiary nitrogen bases, such as, for example, pyridine or triethylamine. In many cases, mixtures of the above solvents with water are also suitable for the reaction. However, even in a pure aqueous phase and especially in the presence of suitable emulsifiers such as alkoxylated fatty alcohols, it is possible to react diisocyanates with diamino acid salts, especially when the diisocyanate is introduced in solution in organic solvents which are not miscible with water (for example benzene, toluene and chlorobenzene).

Generally speaking, high polymer products can be produced at temperatures in the region of 0° C., while other combinations and especially combinations with aliphatic diisocyanates have to be reacted at higher temperatures e.g. up to 150° C. Even if in most cases a molar exchange between amino and isocyanate groups is necessary, it has also been shown in other examples that products of high molecular weight can be obtained with amounts of diisocyanate which are clearly less than molar amounts. In many cases, it can also be desirable to use the diisocyanates in excess.

For isolating the polyurea acids which are formed the reaction mixture is preferably introduced into a lower alcohol or ketone (for example methanol, isopropanol, acetone, methyl ethyl ketone). Polyurea carboxylic acids on the contrary are better precipitated with ether. Small amounts of low aliphatic primary or secondary monoamines (for example diisobutylamine) are preferably added to the precipitants in order to inactivate any free isocyanate groups which may not have reacted. The flaky to granular precipitate of the polymeric salt being formed is filtered with suction, washed with the same precipitant and dried.

The polymers of the invention have a molecular weight ranging from about 1,000 to about 50,000. In contrast to the prior art method the number of acid groups present in one high molecular weight molecule can be predetermined by choosing the proper starting materials, for instance by using a diamine of low molecular weight together with a diisocyanate of higher molecular weight or vice versa. The polymers obtainable in accordance with the aforementioned data, when used for example as sodium salts in water, usually produce highly viscous solutions, even in small concentrations, which solutions have many similarities with colloidal systems such as starch or gelatine solutions. In many cases the water solubility can be considerably increased by adding small amounts of formamide or dimethyl formamide. Generally speaking, a sufficient water solubility is obtained when the fraction of a high molecular weight molecule to be brought into solution by one acid group does not exceed the molecular weight of 400–500. This limit can, however, be safely exceeded if other hydrophilic groups (for example hydroxyl or ether groups) are present in addition to the acid group.

Whereas it is possible to produce products of relatively low molecular weight readily by conducting the reaction in a particular manner or even by using suitable initial components, it is necessary for many purposes to separate fractions of low molecular weight as secondary products from acids which are of particularly highly polymeric nature. In general, this can be effected easily by a neutral or slightly basic (pH 9) dialysis, the fractions of low molecular weight being completely removed in a relatively short time. The solution viscosity of the purified high polymer increases considerably in inverse proportion to that of the low molecular fraction which is removed.

The products of the present invention are believed to be not strictly linear since some NCO groups may react with the urea groups formed in the course of the reaction. Products of particularly high molecular weight can also be obtained by concurrently using relatively small amounts of trifunctional or polyfunctional isocyanates or amines. The amounts necessary for this purpose must, however, be used in carefully controlled quantities in order to avoid complete cross-linking of the polymer which would render the product insoluble.

The novel polyurea acids which are water-soluble and alkali-soluble but insoluble in most of the common organic solvents (soluble, however, for instance, in formamide) are capable of being used for many purposes. Inter alia they can be readily used for antistatic fittings of textiles owing to their hydrophilic properties. Furthermore, foils or films can be cast which are insoluble in common organic solvents such as acetone. Another application for the products of the invention is to facilitate the deposit of heavy metals at the electrodes in electrolytical processes. The products are also particularly valuable in the pharmaceutical field.

The following examples illustrate the process of the invention in greater detail.

Example 1

A solution of 9.6 g. of m-phenylene diisocyanate in 50 ml. of dimethyl formamide is added all at once to a solution of 25.0 g. of sodium-4,4'-diamino-stilbene-2,2'-disulphonate in 200 ml. of formamide while stirring at 10° C. In spite of external cooling, the temperature in the reaction medium rises to 35° C. After 15 minutes, the reaction mixture is incorporated by stirring into 1.5 litres of acetone, to which 5 ml. of diisobutylamine have been added. The sodium salt of polyurea sulphonic acid separates out as a precipitate which can be satisfactorily filtered. After filtering with suction, the precipitate is thoroughly washed with acetone to remove the solvent completely.

The sodium salt is readily soluble in water. 1% solutions are very highly viscous and have K values of between 70 and 90. Concentrated technical sodium chloride solution reprecipitates the polymeric salt from acqueous solution, but physiological common salt solution on the other hand does not. On addition of mineral acid, the free polyurea sulphonic acid separates out in gel-like form, whereas dilute acetic acid and glacial acetic acid do not produce any precipitation. Apart from being soluble in water, the polymeric sodium salt is also soluble in formamide, in acetamide and in mixtures of formamide and dimethyl formamide.

Fractions of low molecular weight, can be separated out by dialysis at a pH value of 9–10. For this purpose, a 2% solution of the sodium salt of polyurea sulphonic acid is placed in a cellophane sheath and dialysed at 8 hours at room temperature. The dialysed solution is highly concentrated in vacuo. The residual water is thereafter removed by boiling with alcohol. In this way, two thirds of the polymer used are recovered, the viscosity thereof in water (1% solution) having risen by about 30%.

Example 2

If the process of Example 1 is carried out replacing the m-phenylene diisocyanate by 10.6 g. of toluylene diisocyanate, there is obtained a salt of a polyurea acid which has a viscosity of $\eta_r=2.09$ (K=61.4) in 1% aqueous solution.

Example 3

8.0 g. of m-phenylene diisocyanate, dissolved in 50 ml. of dimethyl formamide while cooling with ice, are added dropwise at $+10°$ C. while stirring over a period of 30 minutes to a solution of 10.5 g. of sodium p-phenylene diamino sulphonate. (For purification purposes, the free sulphonic acid was dissolved and recrystallised several times from water). The mixture was thereafter stirred for an hour at room temperature. By working up in a manner analogous to that indicated in Example 1, there was obtained a highly polymeric sodium salt having a viscosity of $\eta_r=2.40$ (K=68.2) in water.

About 30% of low molecular weight fractions were separated out by dialysis. The viscosity of the purified high polymer then rose to $\eta_r=3.16$ (K=79.4).

Example 4

A solution of 7.6 g. of m-phenylene diisocyanate in 40 ml. of chlorobenzene is added to a solution of 10.5 g. of sodium p-phenylene diamino sulphonate in 100 ml. of water while cooling with ice and stirring well; the mixture is stirred for 2 hours and after precipitation in 0.8 litre of alcohol to which 10 ml. of ethylamine were added, there is obtained the solid polyurea sulphonic acid salt which is readily soluble in water: $\eta_r=1.50$ (K=43.3).

Example 5

A solution of 7.8 g. of p-phenylene diisocyanate in 40 ml. of dimethyl formamide is added dropwise over a period of 30 minutes and while stirring to a solution of 10.5 g. of sodium p-phenylene diamino sulphonate in 100 ml. of formamide at a temperature of 10° C. The amount of p-phenylene diisocyanate is 2.5% less than the calculated molar amount. By introduction into alcohol, to which has been added a small amount of an aliphatic monoamine, the polysulphonic acid salt is precipitated. The salt has a viscosity of $\eta_r=2.0$ in dimethyl formamide.

The polymer is readily soluble in water, particularly in a presence of small amounts of dimethyl formamide.

Example 6

The solution of 5.33 g. of m-phenylene diisocyanate in 50 ml. of dimethyl formamide is added dropwise over a period of 60 minutes to 5.07 g. of 3,5-diaminobenzoic acid dissolved in 100 ml. of dimethyl formamide, the addition taking place while stirring and cooling to 10° C. The reaction mixture is thereafter heated for 30 minutes at 40–45° C. and introduced after cooling into 1 litre of ether.

The polyurea carboxylic acid which is formed is readily soluble in the calculated amount of aqueous alkali. A value of $\eta_r = 1.12$ was found in 1% aqueous solution.

Example 7

A solution of 8.4 g. of 1,6-hexamethylene diisocyanate in 50 ml. of dimethyl formamide is added dropwise over a period of 30 minutes and at a temperature of 133–140° C. to 9.4 g. of sodium m-phenylene diaminosulphonate in 300 ml. of dimethyl formamide. The mixture is thereafter stirred for another 30 minutes at 135° C. The polyurea sulphonic acid salt is precipitated from the solution obtained by introduction into 1 litre of acetone. The salt dissolves readily in water and has a viscosity of $\eta_r = 1.19$ (1% aqueous solution).

Example 8

If a solution of 10.6 g. of m-phenylene diisocyanate in 50 ml. of dimethyl formamide is added dropwise over a period of 30 minutes and while stirring at 10° C. to a solution of 14.9 g. of sodium 2,6-diamino toluene-4- sulphonate in 150 ml. of formamide, the polyurea sulphonic acid salt is obtained in a form which can readily be filtered with suction after the viscous reaction solution has been introduced into 1.5 litres of alcohol to which 5 ml. of diisobutyl amine have been added. This salt is readily soluble in water and has a viscosity of $\eta_r = 1.76$ (K=52.8).

Example 9

13.7 g. of 2,6-toluylene diamine-3-sulphonic acid hydrochloride (containing 2 mols of water of crystallisation) are dissolved in 100 ml. of formamide and 60 ml. of pyridine. A solution of 8.0 g. of m-phenylene diisocyanate in 50 ml. of formamide is then added dropwise over a period of 30 minutes at 10° C. The mixture is thereafter stirred for another half hour at 45° C.

After removing the major part of the solvent by vacuum distillation, the remaining resinuous solution is added dropwise to 1 litre of alcohol. The polyurea sulphonic acid salt which is formed is readily soluble in water.

Example 10

A solution of 13.9 g. of dimethyl diphenyl methane-4,4'-diisocyanate in 50 ml. of dimethyl formamide is added dropwise while stirring and over a period of 1 hour to a solution of 9.1 g. of sodium m-phenylene diamino-sulphonate in 300 ml. of dimethyl formamide at 10° C. The mixture is thereafter stirred for half an hour at 30° C. After distilling off the major part of the dimethyl formamide in vacuo, the remaining resin is added dropwise to 2 N-hydrochloric acid while stirring. The precipitated free polyurea sulphonic acid, which can be satisfactorily filtered with suction, is washed free from chlorine on the filter by the use of water.

The polyacid is readily soluble in dimethyl formamide, dimethyl formamide and water, and aqueous alkali in the presence of some dimethyl formamide and has a viscosity of $\eta_r = 1.15$ (1% in dimethyl formamide).

Example 11

A solution of 20.8 g. of sodium-4,4'-diaminodibenzyl-2,2'-disulfonate are dissolved in 100 ml. of water and 100 ml. of dimethyl formamide. A solution of 70.5 g. of hexamethylene dicarbamic acid phenylester in 50 ml. of dimethyl formamide are dropped into this solution at 0° C. The mixture is then heated for 3 hours to 90–95° C. The solvents and phenol are distilled off the clear solution in vacuo and the flaky to resinous residue is freed from the last traces of solvent by means of alcohols. The yield of the salt of polyurea sulfonic acid is 90%. The viscosity $\eta_r$ of the 1% aqueous solution is 1.17.

Example 12

7.8 g. of sodium-4,4'-diaminodiphenyl-2,2'-disulfonate and 7.4 g. of the bisulfite adduct of hexamethylene diisocyanate are heated for 4 hours in 100 m. of water. Thereafter, water and phenol are distilled off and the resinous residue is freed from the last traces of water with alcohols. The sodium salt of polyurea sulfonic acid is easily soluble in water to give viscous solution.

Example 13

5.47 g. of lysine dihydrochloride are dissolved in 75 ml. of n/1 sodium hydroxide. 8.9 g. of hexamethylene dicarbamic acid phenylester and 150 ml. of alcohol are added to this solution which is then heated to boiling for 3 hours. The solvent is distilled off in vacuo. The resin thus obtained is freed from the last traces of water and phenol with alcohols. The sodium salt of polyurea carboxylic acid is soluble in water to give a viscous solution. Diluted hydrochloric acid when added to this aqueous solution gives a curdy precipitate.

While certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A process for producing polyureas containing recurring urylene groups having the formula

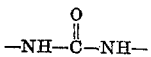

in a linear chain, said polyureas being water-soluble, which comprises reacting (1) a diamine selected from the group consisting of primary and secondary diamines wherein the amino groups are separated by a divalent organic radical, said diamine containing in said organic radical at least one salt radical selected from the group consisting of sulfonates, sulfinates, carboxylates, and phosphates, with (2) an organic diisocyanate of the formula R(NCO), where R is selected from the group consisting of hydrocarbon and $R_1$—O—$R_1$ wherein $R_1$ is hydrocarbon.

2. Process of claim 1 wherein the reaction is conducted in the presence of an inert organic solvent.

3. Process of claim 1 wherein an inert organic solution of the diisocyanate is added to the aqueous phase of the diamine.

4. Process of claim 1 wherein the two reactants are used in about equimolecular proportions.

5. As a new product, a polyurea which is water-soluble, prepared by the process of claim 1.

6. A water-soluble polyurea prepared by the reaction of toluylene diisocyanate with sodium-4,4'-diamino-stilbene-2,2'-disulphonate.

7. A water-soluble polyurea prepared by the reaction of m-phenylene diisocyanate with sodium p-phenylene diamino sulphonate.

8. A water-soluble polyurea prepared by the reaction of sodium-4,4'-diaminodibenzyl-2,2'-disulfonate with hexamethylene dicarbamic acid phenylester.

9. A water-soluble poliyurea prepared by the reaction of toluylene diisocyanate with sodium-4,4'-diamino-dibenzyl-2,2'-disulphonate.

(References on following page)

References Cited in the file of this patent

UNITED STATES PATENTS

| | | |
|---|---|---|
| 2,181,663 | Martin | Nov. 28, 1939 |
| 2,292,443 | Hanford | Aug. 11, 1942 |
| 2,502,548 | Allen et al. | Apr. 4, 1950 |
| 2,801,230 | Fraser et al. | July 30, 1957 |
| 2,820,024 | Kerk | Jan. 14, 1958 |
| 2,833,744 | Neher | May 6, 1958 |

OTHER REFERENCES

Boyer: "Angewandte Chemie," vol. 59A, No. 9, pp. 257–272, (only pp. 263 and 265 presently of interest).